United States Patent
Stroud et al.

(10) Patent No.: US 7,529,361 B2
(45) Date of Patent: *May 5, 2009

(54) METHOD FOR NPA SPLIT PROCESSING

(75) Inventors: Kenneth Robert Stroud, Lago Vista, TX (US); Rick Anthony Cherye, Austin, TX (US); Laura Kay Culli, Millstadt, IL (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/061,990

(22) Filed: Apr. 3, 2008

(65) Prior Publication Data

US 2008/0187107 A1    Aug. 7, 2008

Related U.S. Application Data

(63) Continuation of application No. 11/542,299, filed on Oct. 2, 2006, now Pat. No. 7,372,954, which is a continuation of application No. 10/054,764, filed on Jan. 18, 2002, now Pat. No. 7,139,385.

(51) Int. Cl.
    *H04M 7/00* (2006.01)
(52) U.S. Cl. ............... 379/221.13; 379/221.08
(58) Field of Classification Search ............ 379/219, 379/220.01, 221.08–221.13, 229, 230
    See application file for complete search history.

(56) References Cited

U.S. PATENT DOCUMENTS

| | | | |
|---|---|---|---|
| 5,528,680 A | 6/1996 | Karpicke | |
| 5,933,489 A | 8/1999 | Sensabaugh et al. | |
| 5,978,462 A | 11/1999 | Fuhrmann et al. | |
| 6,091,810 A | 7/2000 | Shaffer et al. | |
| 6,169,793 B1 | 1/2001 | Godwin et al. | |
| 6,289,095 B1 | 9/2001 | Buttitta et al. | |
| 6,330,327 B1 | 12/2001 | Lee et al. | |
| 6,359,975 B1 | 3/2002 | Cai | |
| 7,139,385 B2 | 11/2006 | Stroud et al. | |
| 7,372,954 B2 * | 5/2008 | Stroud et al. | 379/221.13 |
| 2002/0172343 A1 | 11/2002 | Cullie et al. | |

OTHER PUBLICATIONS

Order to Split the 501 NPA, Arkansas Public Service Commission, 8 pages, Jul. 10, 2001.

* cited by examiner

*Primary Examiner*—Harry S Hong
(74) *Attorney, Agent, or Firm*—Brinks Hofer Gilson & Lione

(57) ABSTRACT

A system and method for numbering plan area (NPA) split processing is disclosed. In one implementation, a query is received during a permissive dialing period. The query comprises a destination location that is associated with a first NPA. It is determined whether a first call processing record identifies a service that is NPA sensitive. The first call processing record is associated with a destination location that is undergoing a NPA split. The first call processing record is identified by the destination location and the destination location is associated with a first NPA. A second call processing record is then used for processing in place of the first call processing record when the first call processing record identifies a service that is NPA sensitive. The second call processing record is associated with the destination location that is undergoing an NPA split. The second call processing record is identified by the destination location and the destination location is associated with a second NPA.

18 Claims, 4 Drawing Sheets

METHOD FOR NPA SPLIT PROCESSING

RELATED APPLICATIONS

The present application is a continuation of U.S. patent application Ser. No. 11/542,299, filed Oct. 2, 2006 now U.S. Pat. No. 7,372,954, which is a continuation of U.S. patent application Ser. No. 10/054,764 (now U.S. Pat. No. 7,139,385), filed Jan. 18, 2002, the entirety of each of which is hereby incorporated by reference.

TECHNICAL FIELD

The present invention relates to telecommunication systems and in particular to a method for NPA split processing on a service control point.

BACKGROUND

During an NPA split, one or more new NPAs are created and assigned to an area formerly having only a single assigned NPA. The process of assigning new NPAs to all of the affected telephone lines occurs over a period of time. During this time, which is referred to as the permissive dialing period, calls can be placed to a telephone line using either the old or new NPA. In some networks, call processing records are duplicated during the permissive dialing period. The original call processing record is identified by the telephone number with the old NPA, and the duplicate call processing record is identified by the telephone number with the new NPA. Problems can arise when changes are made to one call processing record but not the other during the permissive dialing period.

Several approaches have been discussed to solve this problem. One approach is described in U.S. Pat. No. 5,978,462. With the approach described in the '462 patent, all call processing records identified by telephone numbers with old NPAs are modified to include a pointer to call processing records identified by telephone numbers with new NPAs. Another approach is described in U.S. Pat. No. 6,289,095. Under this approach, pertinent parameters of all incoming query messages are changed in the network signaling interface of the SCP to replace the old NPA with the new NPA before the message is sent to the application level software of the SCP. This approach can result in undue extra processing time as not all messages may need to have the old NPA replaced with the new NPA.

There is a need, therefore, for a new method for NPA split processing on a service control point.

DETAILED DESCRIPTION OF THE DRAWINGS

By way of introduction, these preferred embodiments can be used to overcome problems encountered during a permissive dialing period of an NPA split. These preferred embodiments also yield several advantages over prior art approaches to this problem. Specifically, these preferred embodiments do not require changes to be made to an existing call processing record to include a pointer to a new call processing record identified by a telephone number with a new NPA. Additionally, unlike prior approaches that require changes to be made to all incoming query messages to a service control point, these preferred embodiments do not require extra processing for services that are not NPA sensitive.

System Overview

Figure 1:
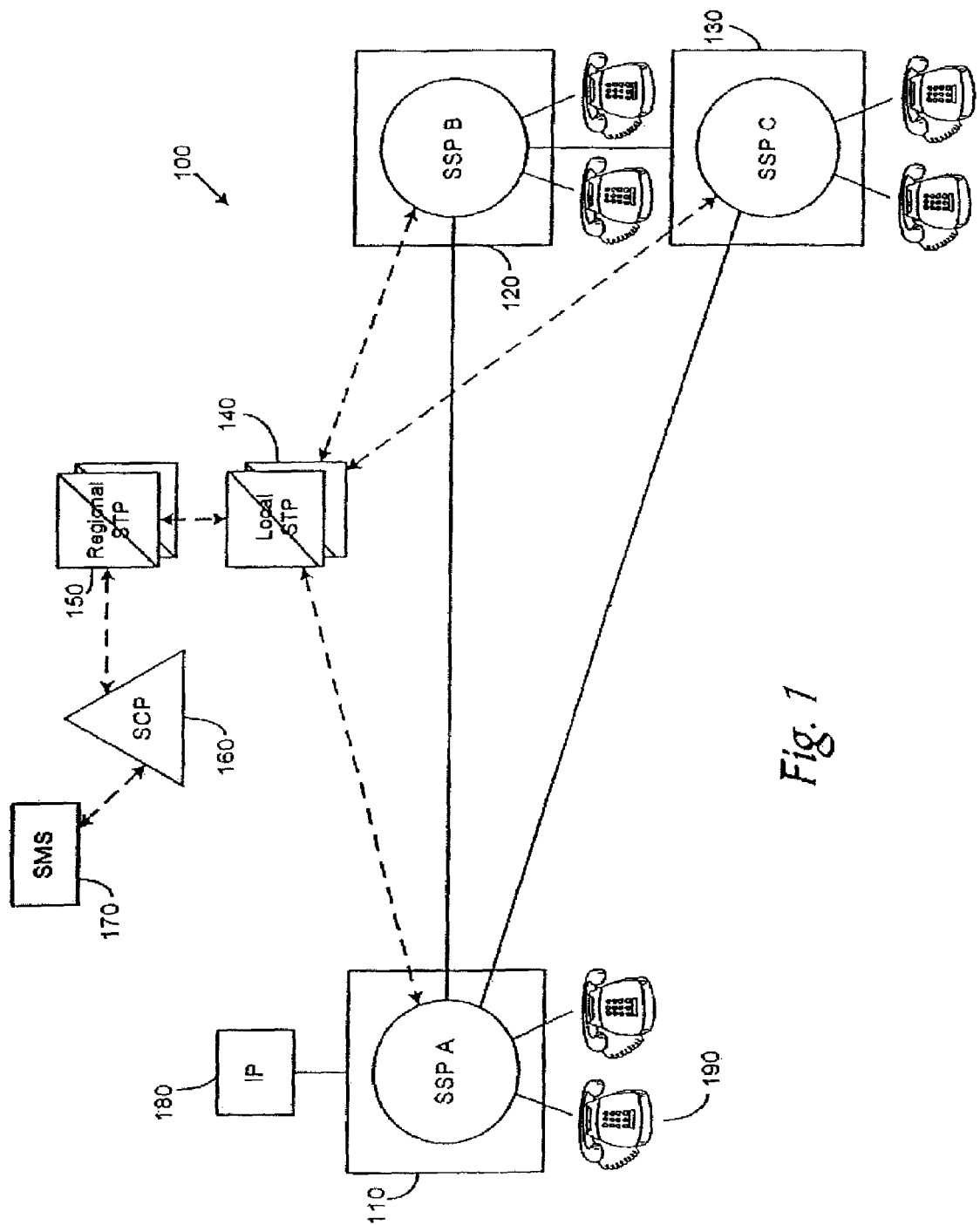
FIG. 1 is a block diagram of a telecommunication network of a preferred embodiment.

Turning now to the drawings, FIG. 1 is a block diagram of a telecommunication network 100 of a preferred embodiment. In this preferred embodiment, the telecommunication network 100 is part of a public-switched telephone network (PSTN) and is implemented as an advanced intelligent network (AIN) using the Signaling System 7 (SS7) network. The network 100 comprises a plurality of service switching points (SSP A 110, SSP B 120, SSP C 130), a local signal transfer point (STP) 140, a regional STP 150, a service control point (SCP) 160, a service management system (SMS) 170, and an intelligent peripheral (IP) 180. In FIG. 1, the dashed lines represent SS7 links, the solid lines between the SSPs 110, 120, 130 represent inter-office trunking, and the solid lines between the SSPs 110, 120, 130 and the telephone stations (such as telephone 190) and the intelligent peripheral 180 represent telephone lines. Although any suitable component can be used, in one preferred embodiment, the SCP 160 is a Telcordia ISCP™, and the intelligent peripheral 180 is IBM's Resource Manager. Another brand of intelligent peripheral that provides similar functionality to IBM's Resource Manager is Lucent's Compact Service Node. In this preferred embodiment, the intelligent peripheral 180 has a direct data network connection to the SCP 160; however, this type of connection is not required.

The SSPs 110, 120, 130 are SS7/AIN-enabled central offices with physical switching devices that route calls from one telephone station to another at the same or different SSP. The local STP 140 transfers signaling messages used during call set-up and routing between the SSPs 110, 120, 130, and the regional STP 150 transfers signaling messages between the SCP 160 and the local STP 140. The SCP 160 provides execution of specialized services for subscribing customers and can communicate with external databases. An SCP with an integrated service creation environment is referred to as an integrated SCP (ISCP). For simplicity, the term SCP shall be used herein to refer to either an SCP or an ISCP. The intelligent peripheral 180 can be used by a calling party to access and change call processing records stored on the SCP 160. In one preferred embodiment, the intelligent peripheral 180 comprises a profile management system having an interactive voice response (IVR) system that recognizes information entered via the calling party's keypad or that utilizes voice recognition, a web-based customer change tool, or any other similar automated system used for customer-initiated change.

In this network 100, telephone lines are assigned a ten-digit telephone number (TN). The first three digits of the TN are referred to as the numbering plan area (NPA) number, or area code. The next three digits are referred to as the NXX, which identifies an SSP that handles calls within a geographic area. The last four digits are referred to as the XXXX, which uniquely represents a particular telephone line in an SSP. The SCP 160 contains call processing records (CPRs) that are identified by TNs, and CPRs identify database services associated with various telephone lines. Often, a person paying a telephone company for use of the telephone line pays an addition fee for the database services. For simplicity, a person associated with a given telephone line will be referred to herein as a "subscriber" regardless of whether that person pays an additional fee for the database services or whether the services are provided free of charge. In operation, a query containing a TN is sent from an SSP to the SCP 160. Application level software in the SCP 160 stores the TN as a call variable, which is used to locate and execute the CPR identified by the TN. This CPR is often referred to as a "trigger CPR" because it is the first CPR that is executed by the application level software on the SCP 160. The CPR describes the services subscribed to by the subscriber and instructs the SCP 160 to perform some service. The results of the service are then sent back to the SSP.

When a local exchange carrier (LEC) runs out of ten-digit telephone numbers within a particular area, the LEC creates a new NPA and assigns the new NPA to some of the existing telephone numbers in that area. The process of creating and assigning one or more new NPAs to an area formerly having only a single assigned NPA is referred to as an NPA split. The process of assigning the NPAs to all of the affected lines occurs over a period of time, and it is often unclear when a particular telephone line has been assigned a new NPA. To assist in the transition, the LEC can provision a period of time during which calls can be placed to the telephone line using either the old or new NPA. Even though calls can be placed to the telephone line with either NPA, the telephone line will, in fact, only have a single TN—either one with the old NPA or one with the new NPA. Accordingly, when a query is sent to the SCP 160 during the permissive dialing period, the query will contain whatever TN is assigned to the telephone line at that time, regardless of whether a caller dialed the TN with the old or new NPA.

During the permissive dialing period, existing trigger CPRs for TNs affected by the NPA split are duplicated by service assurance and provisioning personnel. The duplicate trigger CPR (the "new CPR") contains the same information as the original trigger CPR (the "old CPR") but is identified by the TN with the new NPA (unlike the old CPR, which is identified by the TN with the old NPA). Both the new and old CPRs exist on the SCP 160 during the permissive dialing period. Before the SSP converts to the new NPA, the TN will have the old NPA, and, accordingly, the old CPR will be used. After the SSP converts to the new NPA, the TN will have the new NPA, and the new CPR will be used. At the end of the permissive dialing period, the old CPR will be deleted so that only the new CPR exists.

Problems can be encountered during the permissive dialing period with services that are NPA sensitive. As used herein, a service is NPA sensitive if the operation or effect of the service depends on whether the telephone line is identified by the old or new NPA. A service is NPA sensitive, for example, if a change made to either but not both of the old and new CPRs during the permissive dialing period will result in improper service execution. A service is also NPA sensitive if the service checks a storage location storing one but not both of the following, a telephone number with an old NPA and a telephone number with a new NPA. Examples of specific services that are NPA sensitive include the following services by the assignee of the present invention: Outgoing Call Control (OCC), which blocks certain calls from being made from the subscriber telephone line; Privacy Manager, which requires callers to identify themselves in order to complete a call if the telephone number of the caller cannot be identified by Caller ID; and Positive ID, which allows calls to be placed to a subscriber only if the caller's telephone number is on an accept list. The OCC service will be used below for illustration purposes. It should be noted that the following embodiments can be applied to other NPA sensitive services and should not be limited to the services mentioned above.

Two situations in which problems can occur are in-call processing and profile management. Problems can also occur in other situations, such as when a service checks a storage location to determine what telephone number is stored therein. Those situations will now be discussed.

In-Call Processing

During in-call processing, a query is sent from the SSP to the SCP 160 in response to a trigger (e.g., an originating or terminating trigger) to determine what services should be applied to the call. The query contains the TN of the triggering telephone line, and the SCP 160 uses the TN to locate and execute the CPR identified by the TN. As described above, during the permissive dialing period, two CPRs exists for the subscriber. If changes were made to one of those CPRs but not the other during the permissive dialing period, the CPR retrieved by the SCP 160 might be erroneous or out of date. Consider the situation in which a service allows a subscriber to make a change to one but not both of the CPRs during the permissive dialing period; for example, when the subscriber changes the duplicate CPR to turn on an Outgoing Call Control (OCC) service. If the subscriber's SSP has not yet converted to the new NPA, the SSP will send the SCP 160 a query with the TN having the old NPA, and the SCP 160 will retrieve the old CPR, which indicates that the OCC service is off. Because the change was made to a different CPR than the one retrieved in response to the query, the SCP 160 did not provide the appropriate service.

To overcome this problem, the SCP 160 can analyze the services identified in the CPR to determine if they are NPA sensitive. As shown above, one example of a service that is NPA sensitive is one that allows a change to be made in either but not both of the old and new CPRs during the permissive dialing period. In this preferred embodiment, if a service is NPA sensitive, changes made during the permissive dialing period are forced to be made to the new CPR regardless of whether the TN has the old or new NPA. Further, the duplicate CPR is used during in-call processing regardless of whether the trigger contains the TN with the old or new NPA. In other words, to guarantee that the most current subscriber data is used by the SCP 160, this preferred embodiment uses the new CPR regardless of the NPA that was sent from the SSP.

Figure 2:
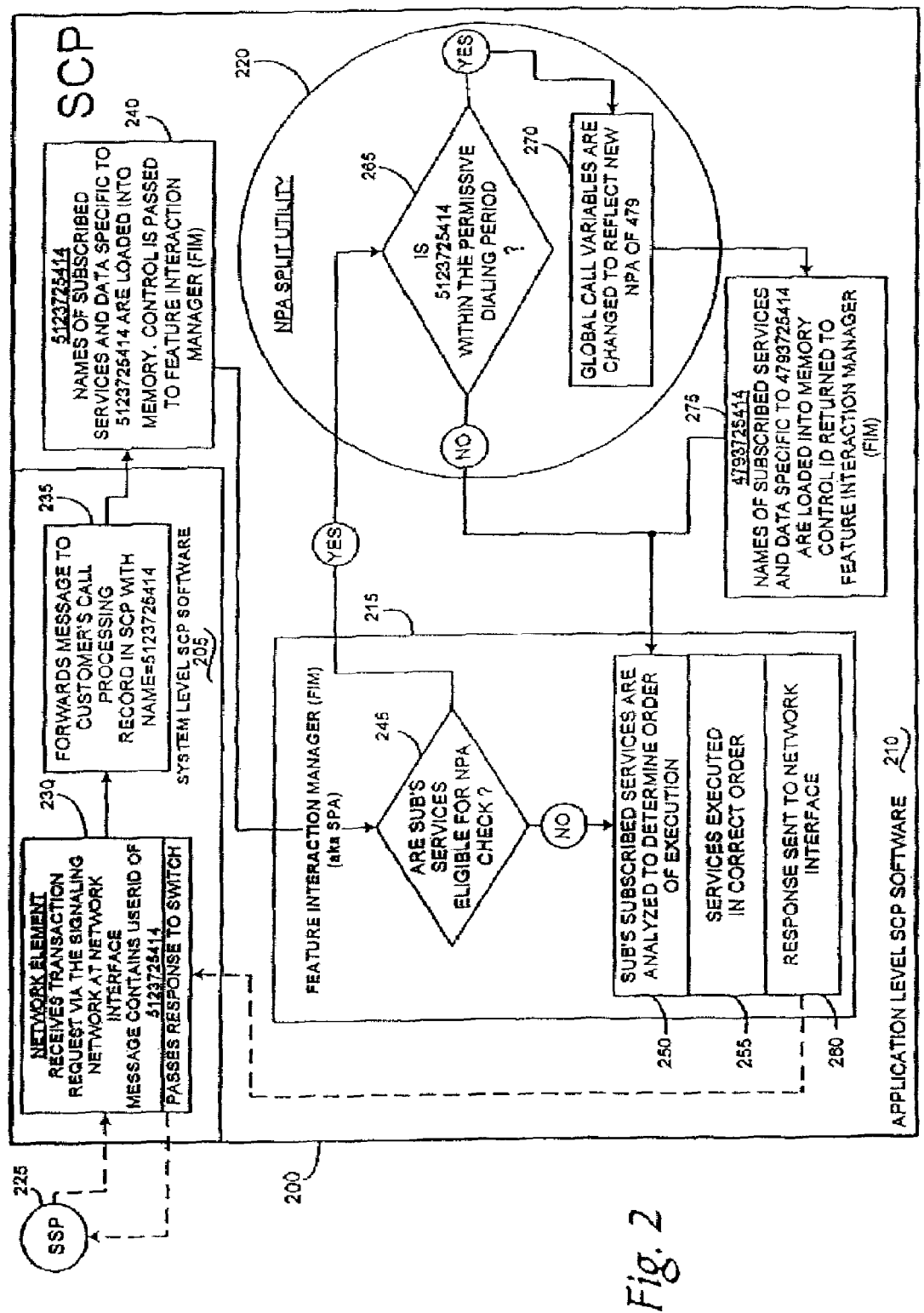
FIG. 2 is an illustration of a service control point of a preferred embodiment.

FIG. 2 is an illustration of a service control point 200 that will further illustrate this preferred embodiment. The SCP 200 comprises system level software 205 and application level software 210. The application level software 210 includes a feature interactive manager (FIM) 215 and an NPA split utility 220. The operation of these components will be illustrated in conjunction with an example in which an SSP 225 sends a query with a TN of 512-372-5414 to the SCP 200 during a permissive dialing period before the NPA is changed to 479. The network element of the SCP 200 receives a transaction request via the signaling network at the network interface (act 230). The message contains the User ID 512-372-5414. The system level software 205 forwards the message to the subscriber's call processing record in the SCP 200 with the name 512-372-5414 (act 235).

The application level software 210 stores the TN identified in the query in a call variable and accesses the CPR identified by this TN (512-372-5414). The names of the subscribed services and data specific to 512-372-5414 are loaded into memory, and control is passed to the FIM 215 (act 240). The FIM 245 determines whether any of the subscribed services are eligible for an NPA check (i.e., whether any of the subscribed services are NPA sensitive) (act 245). If the subscribed services are not NPA sensitive, the FIM 215 analyzes the subscribed services to determine their order of execution (act 250), executes the services in the correct order (act 255), and sends the response to the network interface of the SCP 200 (act 260).

Figure 3:
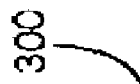
FIG. 3 is an illustration of an NPA split table of a preferred embodiment.

If the subscribed services are NPA sensitive, control is passed to the NPA split utility 220, which determines whether the query was sent in the permissive dialing period (act 265). To do this, the NPA split utility 220 uses an NPA split table 300 (see FIG. 3). The NPA split table 300 lists the NPA/NXX combinations that are currently in permissive dialing and contains (at a minimum) the following columns: Old NPA, Old NXX, New NPA, Permissive Dialing Start Date, and Permissive Dialing End Date. Service assurance and provisioning personnel (i.e., CNOC) can add rows to the table 300 before the beginning date for permissive dialing and can remove the rows anytime after permissive dialing. In operation, the NPA split utility 220 searches the NPA split table 300 using the NPA and NXX combination from the TN presented in the query and determines whether the query was sent in the permissive dialing period. If the query was not sent in the permissive dialing period, acts 250-260 are performed using the data present in the old CPR. If the query was sent in the permissive dialing period, global call variables are changed to reflect the new NPA of 479 (act 270). The new CPR is then retrieved (act 275), and acts 250-260 are performed using the data present in the new CPR.

When the Telcordia ISCP™ is used and an entry is found in the NPA split table, the relevant $Q call variables (those sent in the query from the SSP that contains the old NPA/NXX) will be changed to reflect the new NPA, and the new trigger CPR will be executed. The following table shows some of the trigger types that can utilize the NPA split utility 220 and the associated call variables that can be changed to reflect the new NPA. Different graphs are used, depending on trigger type, due to the different Q call variables that need to be reset, using the new NPA of the triggered number. The call variable $QSERVICEKEY identifies the service key (i.e., the CPR name) to be used to process the call, and the call variable $QUSERID contains the userid in the incoming query message. The value can be the dialed number, a trunk group number, or a private facility ID. The checking of the NPA split table and the replacing of the various call variables can be done in the FIM 215. It should be noted that the following claims should not be limited to the trigger types listed below and that many other existing and future trigger types can benefit from these preferred embodiments.

| Trigger Type | Call Variables Being Changed to Reflect New NPA | Call Variables Names as They Appear in the Telcordia SCP |
|---|---|---|
| Terminationatte | Called number | $QCALLEDPARTYID |
| | Dialed number | $QDIALEDNUMBER |
| | Name of service logic to execite user ID | $QSERVICEKEY |
| | in incoming query message | $QUSERID |
| | TN entered on keypad by caller | $QCOLLECTEDDIGITS |
| 10digit | Called Number | $QCALLEDPARTYID |
| | Dialed Number | $QDIALEDNUMBER |
| | Name of service logic to execute | $QSERVIEKEY |
| OffHookDelay | Calling number | $QCALLINGPARTYID |
| CDPAccessCode | Billed Number | $QCHARGENUMBER |
| CDPInterComCode | Name of service logic to execute | $QSERVICEKEY |
| PRIBChannel | user ID in the incoming query message | $QUSERID |

Profile Management

With the profile management feature of this preferred embodiment, a subscriber can make changes to a subscribed service directly on the SCP (instead of going through an SMS for data update) by using an IVR system located on the SCP or on an intelligent peripheral outside of the SCP or by using a web-based change tool. If the service is NPA sensitive, however, problems can arise if changes are made to the original CPR instead of the duplicate CPR. In that situation, changes made during the permissive dialing period by the subscriber will not be used after the SSP changes to the new NPA. Consider the situation in which a subscriber dials into the intelligent peripheral 180 from his telephone line during the permissive dialing period to turn on an Outgoing Call Control (OCC) service. If the subscriber's SSP has not yet converted to the new NPA, his SSP will send the SCP a message with the TN having the old NPA, and, accordingly, the SCP will update the subscriber's original CPR to indicate that the OCC service is on. When the subscriber makes a call from his telephone line after his SSP converts, his SSP will send a query to the SCP with a TN having the new NPA. The SCP will retrieve the duplicate CPR, which reflects that the OCC service is in the off state since the change made by the subscriber was only applied to the old CPR. Accordingly, the subscriber's calls are not screened even though he turned on the service using profile management. The subscriber will either call his telephone company to report a problem ("call in a trouble ticket") or access profile management again to turn on the OCC service.

As another example, if a subscriber accesses profile management from someone else's telephone line (i.e., a telephone line other than the one with the AIN trigger), the subscriber will be asked by the IVR system of the intelligent peripheral to input his telephone number to identify the CPR that will be changed. Since the subscriber does not know when his SSP will convert, he enters the TN with the old NPA using the IVR system. In this example, the subscriber changes a PIN that is used to temporarily override the blocking of the OCC service. Because the subscriber entered the TN with the old NPA, the new PIN will be stored only in the original CPR. Accordingly, after the subscriber's SSP converts, the new PIN will not work because the duplicate CPR has the old PIN. Similarly, if the subscriber adds access codes during the permissive dialing period to allow incoming calls not to be blocked, only the old CPR will be updated. After the SSP converts, callers cannot reach the subscriber using the new access codes because those codes were not stored in the new CPR.

Figure 4:
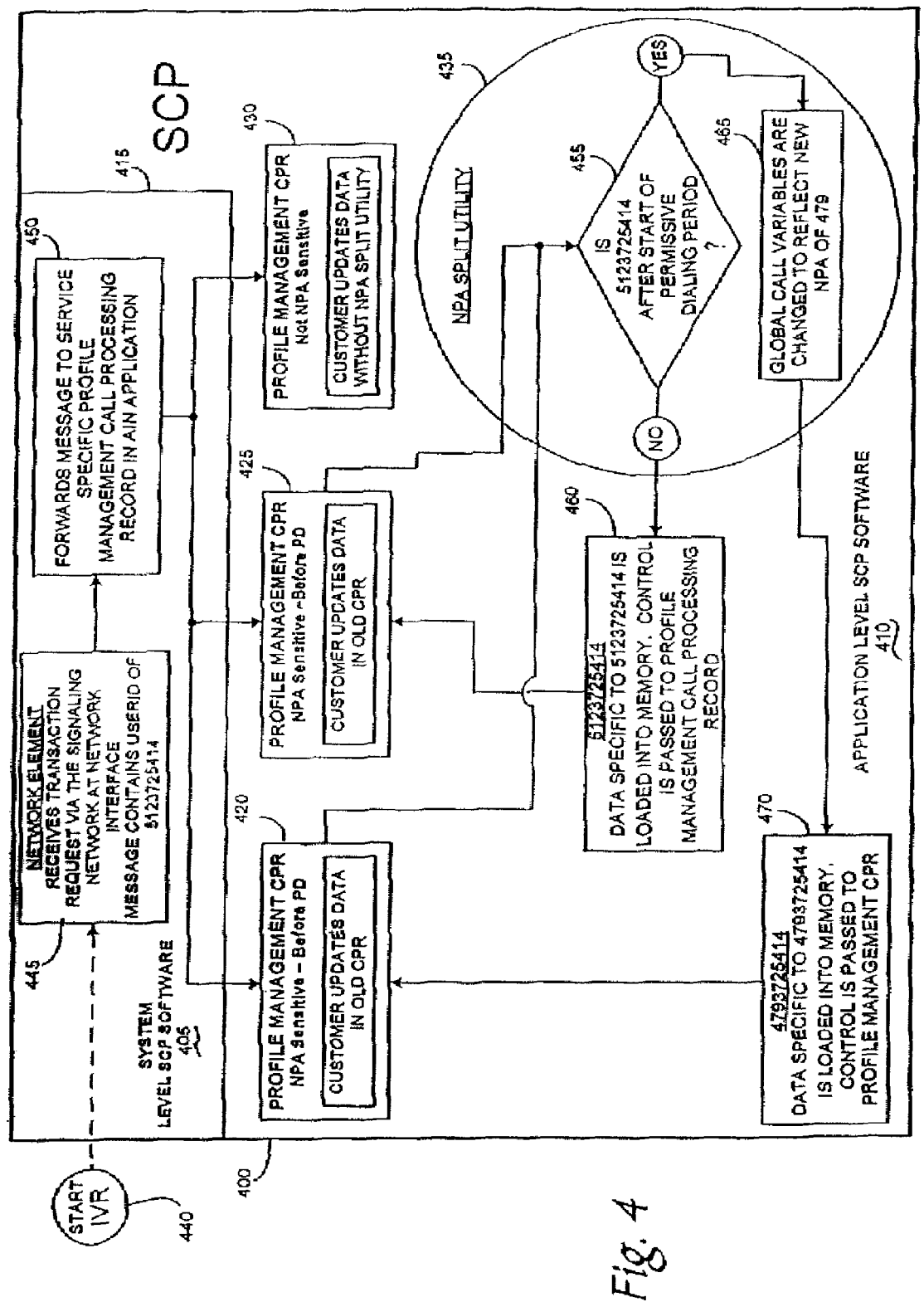
FIG. 4 is an illustration of a service control point of another preferred embodiment.

FIG. 4 is a block diagram of an SCP 400 that illustrates this preferred embodiment. The SCP 400 comprises system level software 405 and application level software 410. The application level software 410 comprises a plurality of profile management CPRs 420, 425, 430 and an NPA split utility 435. Each of the profile management CPRs 420, 425, 430 are associated with a respective service. The services of profile management CPRs 420 and 425 are NPA sensitive, while the service of profile management CPR 430 is not. In this embodiment, each of the profile management CPRs 420, 425, 430 is associated with a different dial-in telephone number, and a subscriber selects which profile management CPRs 420, 425, 430 he wishes to use by dialing the appropriate number. The subscriber is then connected to an intelligent peripheral that starts the IVR process (act 440). Assume that the subscribers TN is 512-372-5414 and that the subscriber calls the intelligent peripheral during the permissive dialing period before the NPA is changed to 479.

After the IVR is started, the network element of the system level software 405 receives a transmission request via the signaling network at the network interface of the SCP 400 (act 445). The message contains the UserID of 512-372-5414. The system level software 405 then forwards the message to the service-specific profile management CPR in the application level software 420 (the AIN application) based on the number dialed by the subscriber (act 450). If the profile management CPR is NPA sensitive (such as profile management CPRs 420 and 425), control is passed to the NPA split utility 435. The NPA split utility 435 searches the NPA split table 300 using the NPA and NXX combination from the TN presented in the query and determines whether the query was sent in the permissive dialing period. If the query was not sent in the permissive dialing period, data present in the original CPR is loaded into memory, and control is passed to profile management CPR 425 (act 460). The subscriber then updates data in his old CPR. If the query was sent in the permissive dialing period, global call variables are changed to reflect the new NPA of 479 (act 465). The subscriber's new CPR is retrieved and loaded into memory, and control is passed to profile management CPR 420 (act 470). The subscriber then updates data in the new CPR. In one preferred embodiment, the Telcordia ISCP™ is used. Call variables sent in the AIN query from the switches to the Telcordia ISCP™ are referred to as Q call variables. If global call variables are changed to reflect the new NPA, the logic replaces the old NPA with the new NPA in the $QANI call variable. The $QANI call variable is the ten-digit line number as found in the initial profile management query.

If the profile management CPR is not NPA sensitive (profile management CPR 430), the subscriber updates data without using the NPA split utility 435. Services that are not NPA split sensitive can use either the subscriber's original or duplicate CPRs during the permissive dialing period or can allow a subscriber to make a change to a CPR that is not keyed to any NPA. For example, services that provide a local routing service are not NPA split sensitive if they can use either original or duplicate CPRs during the permissive dialing period, but do not allow changes to be made to the CPRs during the permissive dialing period. Accordingly, it does not matter which of the two CPRs the service uses during the permissive dialing period. As another example, some abbreviated dialing services, such as 311, allow changes to be made to a CPR during the permissive dialing period but do not use original and duplicate CPRs during a permissive dialing period because these CPRs are not identified by a TN of a subscriber. As yet another example, the Disaster Routing Service offered by the assignee of the present invention has an IVR that allows customers to change PIN numbers and routing options. The subscriber data for this service is stored in CPRs whose names do not contain NPAs, and therefore, are not affected by NPA splits.

Other Situations

As mentioned above, problems associated with NPA sensitive services can occur in situations other than in-call processing and profile management. For example, a problem can occur with a service that checks a storage location to determine what telephone number is stored therein. One such service is an Internet Caller ID (ICID) service provided by the assignee of the present invention. With ICID, a subscriber who is using his telephone line to use the Internet receives a pop-up window with Caller ID information when someone calls his line while he is on the Internet. In operation, an application on the subscriber's computer stores the TN of the subscriber's telephone line in a registration server. When an incoming call arrives at the subscriber's SSP, a trigger is sent to an SCP, which consults the registration server to see if the subscriber's TN is stored therein. If it is, the SCP will enable the ICID functionality. A problem occurs during an NPA split when the subscriber's application stores the TN with old NPA, and the SCP checks the registration server for the TN with the new NPA, or vice versa. To solve this problem, the SCP can check the registration server for both TNs. In operation, the SCP assigns the TN with the old NPA to a call variable and determines if that number is stored in the registration server. If it is not, the SCP replaces the old NPA with the new NPA in the call variable and determines if the TN with the new NPA is stored in the registration server.

Although the embodiments were described above with respect to an NPA split, these embodiments can be used with any kind of change to a numbering plan. For example, changes can be made to codes other than area codes, such as with telephone numbers in countries that use different numbering plans. Further, although these preferred embodiments used telephone numbers to uniquely identify a telephone line and a subscriber's CPR, any type of identifier can be used. It should also be noted that originating or terminating SSPs can be used to send a query to an SCP. Additionally, while the telephone networks were described above as AIN networks, other types of networks can be used. More generally, any suitable type of telecommunication element (e.g., switches, processors) can be used to implement the methods described above. Further, computer-readable media having computer-readable code embodied therein for implementing these methods can be used.

It is intended that the foregoing detailed description be understood as an illustration of selected forms that the invention can take and not as a definition of the invention. It is only the following claims, including all equivalents, that are intended to define the scope of this invention.

The invention claimed is:

1. A method for numbering plan area (NPA) split processing, the method comprising:
receiving a query comprising a destination location associated with a NPA;
determining whether the NPA is undergoing a NPA split;
determining whether a service associated with the NPA and the destination location is NPA sensitive; and
using a second call processing record in place of a first call processing record when it is determined that the NPA is undergoing a NPA split and the service associated with the NPA is NPA sensitive.

2. The method of claim 1, wherein the query is received during a permissive dialing period.

3. The method of claim 1, further comprising:
determining that the query was received during a permissive dialing period.

4. The method of claim 1, wherein the first call record identifies whether the service is NPA sensitive.

5. The method of claim 1, further comprising:
using the first call processing record when it is determined that the NPA is undergoing a NPA split and the service associated with the NPA is not NPA sensitive.

6. The method of claim 1, wherein a service is NPA sensitive if a change made to either, but not both of, the first and second call processing records will result in improper service execution.

7. A computer-readable storage medium comprising a set of instructions for numbering plan area (NPA) split processing, the set of instructions to direct a processor to perform acts of:
receiving a query comprising a destination location associated with a NPA;
determining whether the NPA is undergoing an NPA split;
determining whether a service associated with the NPA and the destination location is NPA sensitive; and
using a second call processing record in place of a first call processing record when it is determined that the NPA is undergoing a NPA split and the service associated with the NPA is NPA sensitive.

8. The computer-readable storage medium of claim 7, further comprising a set of instructions to direct a processor to perform acts of:

determining that the query was received during a permissive dialing period.

9. A system for numbering plan area (NPA) split processing, the system comprising:
a network element operative to:
receive a query comprising a destination location associated with a NPA;
determine whether the NPA is undergoing a NPA split;
determine whether a service associated with the NPA and the destination location is NPA sensitive; and
use a second call processing record in place of a first call processing record when it is determined that the NPA is undergoing an NPA split and the service associated with the NPA is NPA sensitive.

10. A method for numbering plan area (NPA) split processing, the method comprising:
receiving a query comprising a destination location associated with a NPA undergoing a NPA split;
retrieving a first call processing record associated with the destination location and a service;
determining whether the service is NPA sensitive; and
changing a call variable associated with the destination location when it is determined that the service is NPA sensitive.

11. The method of claim 10, wherein the query is received during a permissive call period.

12. The method of claim 10, further comprising:
determining that the query was received during a permissive call period.

13. The method of claim 10, wherein changing the call variable comprises:
changing a NPA in the call variable to a new NPA.

14. The method of claim 10, further comprising:
retrieving a second call processing record associated with the changed call variable; and
using the second call processing record in place of the first call processing record.

15. The method of claim 10, further comprising:
identifying the new NPA from a table correlating the NPA undergoing the NPA split with the new NPA.

16. A computer-readable storage medium comprising a set of instructions for numbering plan area (NPA) split processing, the set of instructions to direct a processor to perform acts of:
receiving a query comprising a destination location associated with a NPA undergoing a NPA split;
retrieving a call processing record associated with the destination location and a service;
determining whether the service is NPA sensitive; and
changing a call variable associated with the destination location when it is determined that the service is NPA sensitive.

17. The computer-readable storage medium of claim 16, further comprising a set of instructions to direct a processor to perform acts of:
determining the query was receiving during a permissive call period.

18. A system for numbering plan area (NPA) split processing, the system comprising:
a network element operative to:
receive a query comprising a destination location associated with a NPA undergoing a NPA split;
retrieve a call processing record associated with the destination location and a service,
determining whether the service is NPA sensitive; and
changing a call variable associated with the destination location when it is determined that the service is NPA sensitive.

* * * * *